(12) United States Patent
Stone et al.

(10) Patent No.: US 9,041,996 B2
(45) Date of Patent: May 26, 2015

(54) CONTROLLING ABSORPTION OF LIGHT IN A CAVITY

(71) Applicant: Yale University, New Haven, CT (US)

(72) Inventors: A. Douglas Stone, New Haven, CT (US); Hui Cao, New Haven, CT (US); Li Ge, New Britain, CT (US); Yidong Chong, Singapore (SG)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 14/224,203

(22) Filed: Mar. 25, 2014

(65) Prior Publication Data

US 2014/0204442 A1 Jul. 24, 2014

Related U.S. Application Data

(63) Continuation of application No. 13/380,625, filed as application No. PCT/IB2010/001583 on Jun. 29, 2010, now abandoned.

(60) Provisional application No. 61/221,313, filed on Jun. 29, 2009.

(51) Int. Cl.
| | |
|---|---|
| *G02F 1/01* | (2006.01) |
| *G02B 6/12* | (2006.01) |
| *G02B 6/26* | (2006.01) |
| *G02B 5/28* | (2006.01) |
| *G02F 1/015* | (2006.01) |

(52) U.S. Cl.
CPC .. *G02F 1/01* (2013.01); *G02B 6/12* (2013.01); *G02B 6/266* (2013.01); *G02B 2006/12061* (2013.01); *G02B 2006/12097* (2013.01); *G02B 2006/12126* (2013.01); *G02F 1/0126* (2013.01); *G02F 2001/0155* (2013.01); *G02B 5/28* (2013.01)

(58) Field of Classification Search
CPC ........... G02B 5/28; G02F 1/01; G02F 1/0126; G02F 2001/0155
USPC .......................... 359/241, 244, 299, 586, 589
See application file for complete search history.

(56) References Cited

PUBLICATIONS

Fork, R.L., et al., "Generation of Optical Pulses Shorter Than 0.1 PSEC by Colliding Pulse Mode Locking", Applied Physics Letters, American Institute of Physics, Melville, NY, US, vol. 38, No. 9, May 1, 1981, pp. 671-672.*
Kovalev, V., et al., "Nonlinear Absorption of Counterpropagating Waves in Narrowgap Semiconductors", Infrared Physics, vol. 31, No. 4, Jan. 1, 1991, pp. 343-349.*
Boubal, Francois, "International Search Report" for PCT/IB2010/001583, as mailed Sep. 17, 2010, 3 pages.

(Continued)

*Primary Examiner* — Joseph P Martinez
(74) *Attorney, Agent, or Firm* — Riverside Law LLP

(57) ABSTRACT

Described is a method of controlling the absorption of light in a cavity, a system in which absorption is so controlled, and an interferometer embodying the underlying physical concept. Materials can be made to completely absorb incident light when the light is imposed in a specific pattern of illumination. Coherent perfect absorption, as the process is referred to, is achieved when a cavity is illuminated coherently and monochromatically by the time-reverse of the output of a lasing mode. Varying the parameters of the incident light and/or of the cavity allows the absorption of the incident light by the cavity to be controlled; enhanced or even reduced.

20 Claims, 8 Drawing Sheets

(a)

(b)

(56) References Cited

PUBLICATIONS

Williams, G., et al., "Ultraviolet induced absorption and Bragg grating inscription in $RbCdF_3:Mn^{2+}$", Journal of Applied Physics, American Institute of Physics, New York, US, vol. 102, No. 11, Dec. 6, 2007, pp. 113106-113106.

Dietel, W., et al, "Theoretical and Experimental Investigations of Colliding Pulse Mode-Locking (CPM)", Jan. 1, 1982, Picosecond Phenomena III; [Springer Series in Chemical Physics], Berlin, Springer Verlag, DE, pp. 45-48.

* cited by examiner

CONTROLLING ABSORPTION OF LIGHT IN A CAVITY

CROSS-REFERENCE TO RELATED APPLICATIONS

This application is a continuation of and claims priority from U.S. patent application Ser. No. 13/380,625, filed on Feb. 16, 2012. U.S. patent application Ser. No. 13/380,625 is a national stage filing of International Patent Application No. PCT/IB2010/001583. U.S. patent application Ser. No. 13/380,625 claims priority from U.S. Provisional Patent Application No. 61,221,313, filed on Jun. 29, 2009. International Patent Application No. PCT/IB2010/001583, U.S. patent application Ser. No. 13/380,625 and U.S. Provisional Patent Application No. 61,221,313 are incorporated herein by reference.

FIELD OF THE INVENTION

The present invention relates to a method of controlling the absorption of light in a cavity, to a system in which absorption is controlled in a corresponding fashion, and to an interferometer embodying the underlying physical concept.

SUMMARY OF THE INVENTION

According to a first aspect of the present invention, there is provided a method of controlling the absorption of light, the method comprising the steps of:

providing a cavity comprising a medium having a complex index of refraction $n_m$, the cavity adapted to confine light within the medium;

irradiating the cavity in a first direction with a first beam of light having a wavelength $\lambda$; and irradiating the cavity in a second direction with a second beam of light having a same wavelength $\lambda$;

characterised by;

configuring the first beam of light and the second beam of light such that a pattern of irradiation in the cavity created by interference between at least the first and second beams of light corresponds to the inverse of the emission pattern of a laser of wavelength $\lambda$ having a complex index of refraction $n_m^*$ that is the complex conjugate of the index of refraction of the medium $n_m$; and controlling one or more parameters of the cavity or one or both of the first and second light sources so as to control the amount of absorption of light by the medium within the cavity.

Essentially, by creating a pattern of irradiation corresponding to the inverse of the emission pattern of a laser means that the medium acts like a laser in reverse. The mechanism by which "coherent perfect absorption" or "coherently reduced absorption" occurs is explained in more detail in the specific description. The absorbing medium can be thought of as a "loss medium" analogous to the gain medium of a laser.

Preferably, the step of controlling one or more parameters of one or both of the first and second light sources comprises controlling the relative phase between the first light source and second light source. Alternatively, or additionally, the step of controlling one or more parameters of one or both of the first and second light sources comprises controlling the frequency of one or both of the first light source and second light source.

The phase difference between the first and second beams of light and/or the frequency relationship between the first and second beams of light can be used to control whether the material completely absorbs incident light or absorbs incident light less than incoherent light (or anywhere in between).

Alternatively, or additionally, the step of controlling one or more parameters of the cavity comprises controlling the refractive index of the medium. Preferably, the step further comprises tuning the refractive index of the medium onto and away from values of the index of refraction that result in coherent perfect absorption. Preferably, the refractive index of the medium $n_m$ is controlled by electrically or optically pumping the medium.

Optionally, the cavity is defined by interfaces between the medium and another medium of differing refractive index. Alternatively, the cavity comprises one or more reflectors which define said cavity.

The simplest embodiment of the cavity consists only of the interfaces between the "loss medium" and, for example, a lower index material such as air or a coupling waveguide or optical fibre. Other embodiments employ mirrors which increase the Q of the cavity and reduce the degree of absorption required to achieve coherent perfect absorption (because the light is better confined and undergoes more passes of the "loss medium").

Optionally, the step of irradiating the cavity in a second direction with a second beam of light comprises reflecting the first beam of light to provide said second beam of light, the second direction being parallel and opposite to the first direction.

In this way, a single input absorber may be realised.

Optionally, the method comprises irradiating the medium with one or more additional beams of light, each of said additional beams of light configured to interfere with the first, second and any other additional beams of light to create the pattern of irradiation.

In this way, a multi-input (N>2) absorber may be realised.

Preferably, the method further comprises the step of extracting energy corresponding to the absorbed light from the medium.

Optionally, the phase of the second beam of light is modulated so as to modulate the energy extracted from the medium.

Alternatively, the method comprises the step of monitoring the energy extracted from the medium so as to determine the relative phase between the first and second beams of light.

Optionally, the step of controlling the first and second beams of light includes controllably switching on or off the second beam of light such that the medium selectively absorbs or transmits the first beam of light.

According to a second aspect of the present invention, there is provided an absorber system for controlled absorption of light, the system comprising:

a cavity comprising a medium having an index of refraction $n_m$; and a first light source and a second light source, the first and second light sources irradiating the cavity in different directions;

wherein the first and second light sources are configured such that a pattern of irradiation in the cavity created by interference between light from at least the first and second light sources corresponds to the inverse of the emission pattern of a laser medium having a complex index of refraction $n_m^*$ that is the complex conjugate of the index of refraction of the medium $n_m$; and whereby varying one or more parameters of the cavity or one or both of the first and second light sources correspondingly varies the amount of absorption of light by the medium within the cavity.

Preferably, varying the relative phase between the first light source and second light source correspondingly varies the amount of absorption of light by the medium within the cavity. Alternatively, or additionally, varying the frequency of one or both of the first light source and second light source correspondingly varies the amount of absorption of light by the medium within the cavity.

Optionally, the cavity is defined by interfaces between the medium and another medium of differing refractive index. Alternatively, the cavity comprises one or more reflectors which define said cavity.

Optionally, the absorber system comprises one or more additional light sources, each of the one or more additional light sources configured such that light therefrom interferes with light from the first, second and any other additional light source to create the pattern of irradiation.

Preferably, the medium has a complex index of refraction that varies smoothly with frequency, so that the condition for coherent perfect absorption is satisfied within a tunable frequency range of the first and second light sources.

Preferably, the medium comprises a semiconductor material having a bandgap close to the tunable frequency range of light from the first and second light sources, so that the index of refraction varies smoothly within said frequency range. Optionally, the index of refraction of the semiconductor material is controlled extrinsically, for example by doping, carrier injection or optical pumping. Such a coherent perfect absorber can thereby be made to function both well above and well below the intrinsic bandgap.

Alternatively, the medium comprises a material having a complex index of refraction that may be controlled externally. Optionally, the complex index of refraction is controlled by applying an electrical current. Alternatively, the complex index of refraction is controlled by applying light of a different frequency from that of the first and second light sources.

Preferably, the absorber system further comprises doped regions adjacent to the cavity to extract energy from the medium in the form of electrical current.

Optionally, the second light source comprises a reflector configured so as to reflect light from the first light source and thereby provide said second light source.

The reflector may comprise a distributed bragg reflector.

Optionally, the absorber system further comprises one or more waveguides adapted to transmit light from one or both of the first and second light sources to the cavity.

Optionally, the absorber system comprises a waveguide, the waveguide comprising the absorber medium and integrally formed with the one or more waveguides to transmit light to the cavity.

Alternatively, the absorber system comprises an optical fibre having a segment comprising the cavity.

According to a third aspect of the present invention, there is provided an interferometer comprising;

a cavity comprising a medium having an index of refraction $n_m$;

a first arm to couple a first portion of incident light to one end of the cavity; and a second arm to couple a second portion of incident light to another end of the cavity;

wherein the interference between light from at least the first and second light sources creates a pattern of irradiation in the medium corresponding to the inverse of the emission pattern of a laser medium having a complex index of refraction $n_m^*$ that is the complex conjugate of the index of refraction of the medium $n_m$; and wherein variation in the optical lengths of one or both of the first and second arms results in modulation of the amount of absorption of light within the cavity, Preferably, the first and second arms comprise waveguides adapted to transmit light from one or more light sources to the cavity.

Preferably, the cavity and the first and second arms are integrally formed on a semiconductor substrate, the cavity and/or one or both of the first and second arms comprising a ridge waveguide.

Preferably, the cavity comprises one or more distributed Bragg reflectors which define the cavity. Alternatively, the cavity is defined by interfaces between the medium and the first and second arms.

Optionally, the interferometer further comprises doped regions adjacent to the cavity to extract energy from the cavity in the form of electrical current. Alternatively, energy is extracted from the cavity in the form of a heat signal.

BRIEF DESCRIPTION OF THE FIGURES

The present invention will now be described by way of example only and with reference to the accompanying figures in which.

DETAILED DESCRIPTION OF THE INVENTION

Note that throughout this document references to the term light shall be construed as meaning electromagnetic radiation of any wavelength, and not only those wavelengths capable of causing the sensation of vision. Accordingly, the term light includes infrared and ultraviolet radiation as well as visible radiation.

The present invention relates to a process discovered by the Applicant by which a cavity can be made to completely absorb incident light. Coherent perfect absorption, as the process is referred to, occurs when the incident light irradiates the cavity in a particular way. Coherent perfect absorption may be achieved by fabricating a cavity medium with a specified complex index of refraction $n_m$ (which is dependent on the size and shape of the material and the frequency of the desired absorption wavelength), and irradiating the cavity in an appropriate, calculable manner which turns out to be the inverse of the emission pattern of a laser of the same size and shape and whose refractive index is $n_m^*$—the complex conjugate of $n_m$. The effect of the complex conjugation is to interchange the amplification coefficient of the notional laser with the absorption coefficient of the cavity material.

The coherent perfect absorption process arises from the interplay of interference and absorption. In a two-channel system the reflected part of a first incident beam interferes destructively with the transmitted part of the second incident beam and vice versa. In the presence of specific amounts of dissipation, there exist interference patterns that trap the incident light indefinitely. In analogy to a laser, the incoming light is equivalent to the time-reversed output of coherent light from the laser, the irradiation pattern within the cavity is equivalent to the emission pattern of the laser, and the absorption of light (dissipation) by the cavity material is equivalent to the time-reversed stimulated emission of light due to population inversion in the laser.

In summary, a cavity is illuminated coherently and monochromatically by the time-reverse of the output of a lasing mode, and the incident radiation is perfectly absorbed.

It is also realised that varying the parameters of the system allows the absorption of the incident light by the cavity to be controlled. As will be discussed below, different coherent conditions of illumination will result in absorption which is lower than that observed with incoherent illumination. This provides a mechanism for coherent control of absorption which can range between coherent perfect absorption and coherent reduced absorption.

For a cavity of a given size and shape with uniform complex index, the possible values of the index of refraction $n_n$, of the cavity material are determined by evaluating the equation:

$$[\nabla^2+(2\pi n_m f/c)^2]E(r)=0 \qquad \text{(Equation 1)}$$

where c is the speed of light and f is the frequency.

Figure 1:
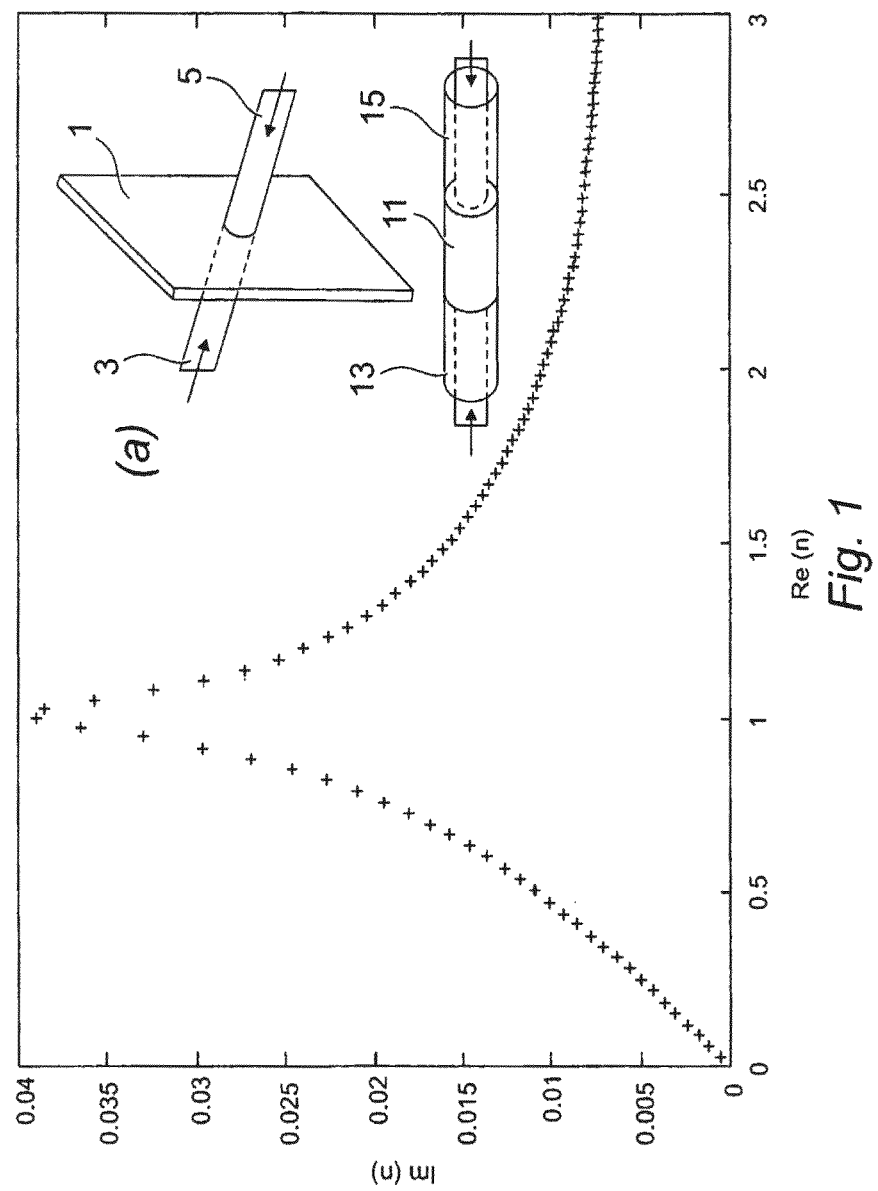
FIG. 1 illustrates the values of complex refractive index $n_m$ that lead to perfect absorption and (inset) embodiments of two two-port systems in accordance with an aspect of the present invention.

Inset (a) of FIG. 1 illustrates an exemplary embodiment of the present invention, in which the cavity comprises a uniform slab 1 illuminated with two counter propagating beams of light 3,5—a so called "two-port system". FIG. 1 (graph) illustrates the complex refractive indices $n_m$ of said slab material that lead to coherent perfect absorption. The wave-vector of the incident light is fixed at $k_0=100/a$, where a is the thickness of the absorbing region, and the material outside the absorbing region has been assumed to have a refractive index of n=1 as appropriate.

A similar, but alternative, two-port system is illustrated in inset (b). This embodiment comprises an optical fibre having a segment 11 comprising the absorbing material; the abutting portions of fibre 13,15 serving to couple the counter propagating beams of light into the absorbing medium. In this configuration, the external refractive index n is greater than 1, which would result in the peak in the imaginary part of $n_m$ as illustrated in FIG. 1 (graph) being shifted to the right.

It should be noted that the imaginary part of the index necessary for perfect absorption varies slowly with the frequency of irradiation. Accordingly, a convenient method for realising coherent perfect absorption is to irradiate a semiconductor material near its bandgap. As the absorption coefficient varies rapidly with frequency it will easily pass close to the perfect absorption point. Furthermore, the absorption can be controlled extrinsically, for example by doping, carrier injection or optical pumping, in which cases a coherent perfect absorber can be made to function both well above and well below the intrinsic bandgap.

Figure 2:
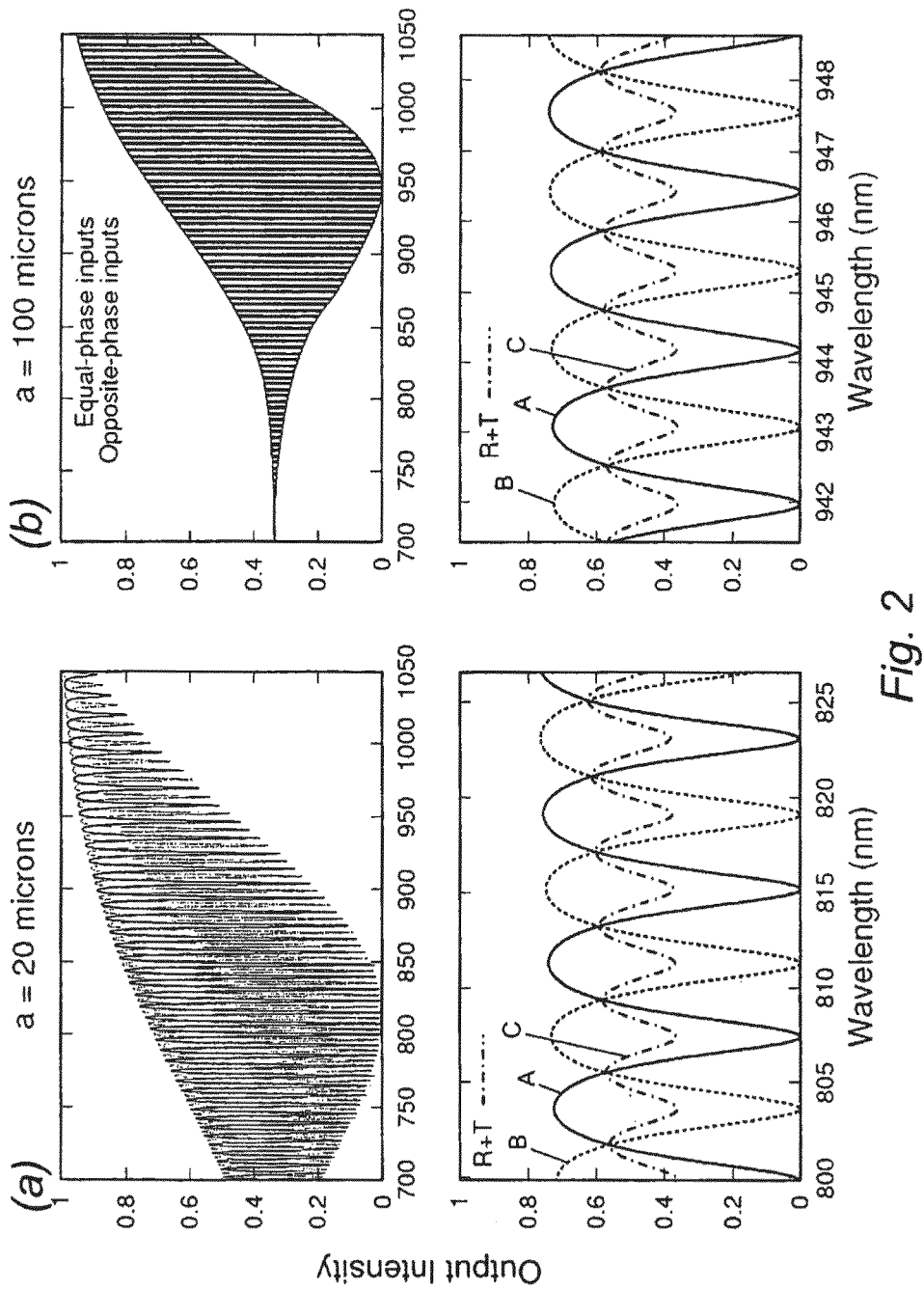
FIG. 2 illustrates the output from a Silicon wafer (a) of 20 micron thickness and (b) of 100 micron thickness when coherent equal-intensity beams of light are applied to its two faces in accordance with an aspect of the present invention.

FIG. 2 illustrates the output radiation from a crystalline Silicon wafer when coherent equal-intensity beams are normally incident upon its two faces. Results are presented for wafers of (a) 20 microns thickness and (b) 100 microns thickness. Curves "A" are the normalised output intensities for equal phase input beams incident on the wafer as a function of wavelength. Curves "B" are the normalised output intensities for opposite phase input beams incident on the wafer as a function of wavelength. The bottom plots are magnifications of the upper plots where coherent perfect absorption occurs.

The coherent perfect absorption condition, i.e. where either curve reaches zero, is found to occur at several discrete wavelengths in the infrared spectrum; at ~815 nm for the 20 micron wafer and at ~945 nm for the 100 micron wafer. Intermediate thicknesses may be assumed to provide coherent perfect absorption at intermediate wavelengths so a particular wavelength may be targeted by tailoring the thickness of the wafer.

It should be emphasised that the zeroes in the coherent perfect absorption profiles are distinct from absorption resonances of the atomic or molecular medium, which do not require specific illumination conditions.

Figure 3:
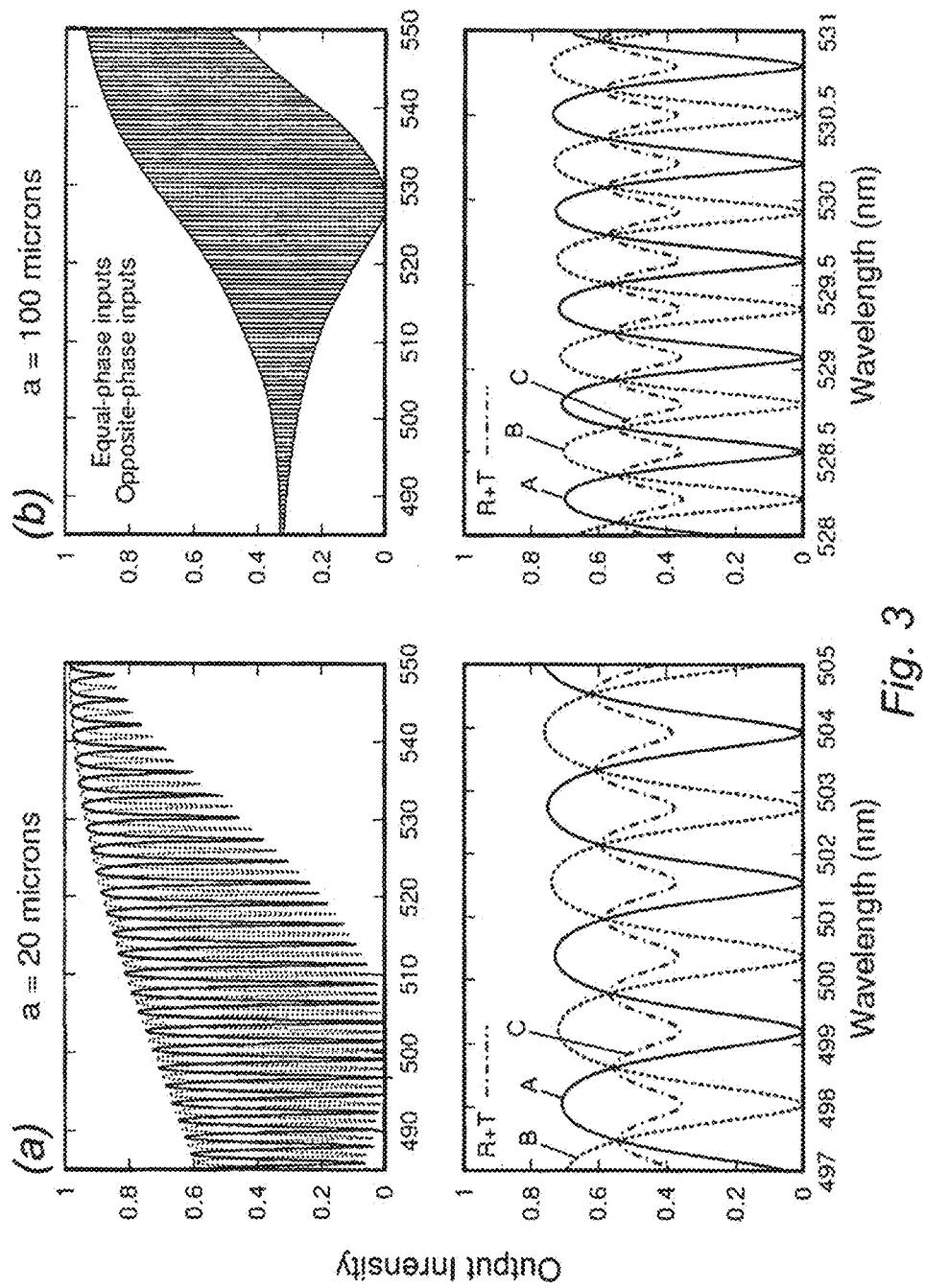
FIG. 3 illustrates the output from a Gallium Phosphide wafer (a) of 20 micron thickness and (b) of 100 micron thickness when coherent equal-intensity beams of light are applied to its two faces in accordance with an aspect of the present invention.

FIG. 3 illustrates the output radiation from a Gallium Phosphide wafer when coherent equal-intensity beams are normally incident upon its two faces, similarly to FIG. 2. In contrast to the Silicon wafer, coherent perfect absorption occurs in the visible spectrum; at ~500 nm for the 20 micron wafer and ~529 nm for the 100 micron wafer.

The widths of the dips in the coherent perfect absorption profiles illustrated in FIGS. 2 and 3 range from 0.1 nm to 1 nm.

Also illustrated in the bottom plots of both FIGS. 2 and 3 are curves "C" which represent the output intensities for incoherent beams. It is clear that the absorption anti-resonances actually provide comparatively reduced absorption to that of incoherent illumination; as a result, absorption can not only be enhanced using this technique, but can also be reduced.

Accordingly, while it is evident that varying the frequency of the incident light provides a means for varying the absorption of the light in the cavity, it is possible to modulate the absorption without changing frequency by adjusting the relative phase of the input beams.

By way of illustration, if the cavity exhibits coherent perfect absorption for input beams of a particular frequency and relative phase, coherently reduced absorption can be induced by reversing the phase of one of the input beams. This causes the absorption to reach a minimum (corresponding to a local maximum output in traces A or B in FIGS. 2 and 3). As mentioned above, said minimum absorption is actually lower than that achieved using incoherent input beams.

Figure 4:
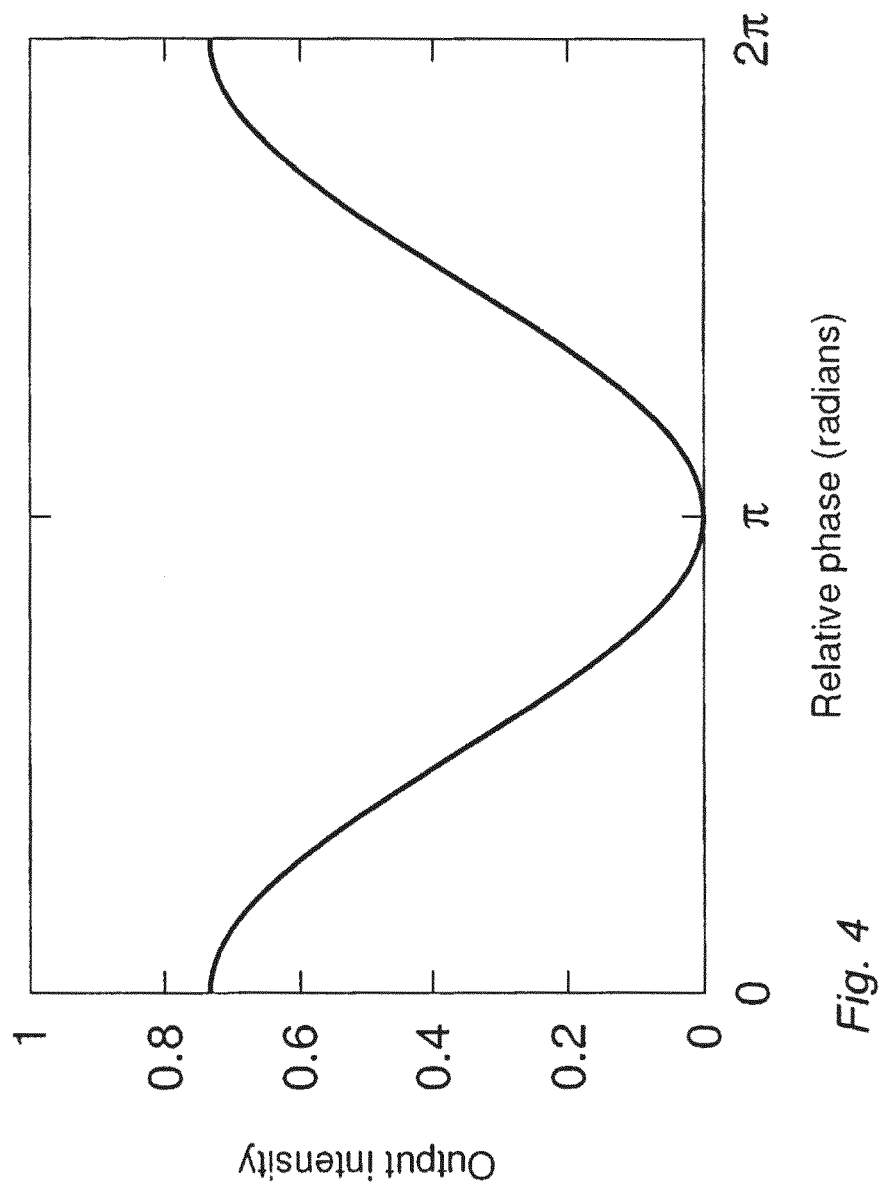
FIG. 4 illustrates the output variance from the 100 microns thick Silicon wafer as a function of the relative phase of the beams of light applied to its two faces in accordance with an aspect of the present invention.

FIG. 4 illustrates the output intensity from the 100 micron Silicon wafer as a function of the relative phase of the input beams. In this example, the input beams have a wavelength of ~945 nm (coinciding with a coherent perfect absorption resonance as illustrated in FIG. 2) have equal intensities and produce output beams of equal intensities regardless of their relative phase. The complex refractive index at this wavelength is n=3.6+0.00086i. As illustrated, when the input beams are completely (π radians) out of phase the light is completely (>99.99%) absorbed. When the input beams are completely in phase the light is 27% absorbed. Therefore by modulating the relative phase of the input beams an intensity contrast of 73% is achievable—note that the contrast value is determined by the refractive index mismatch between the cavity and the external region.

Figure 5:
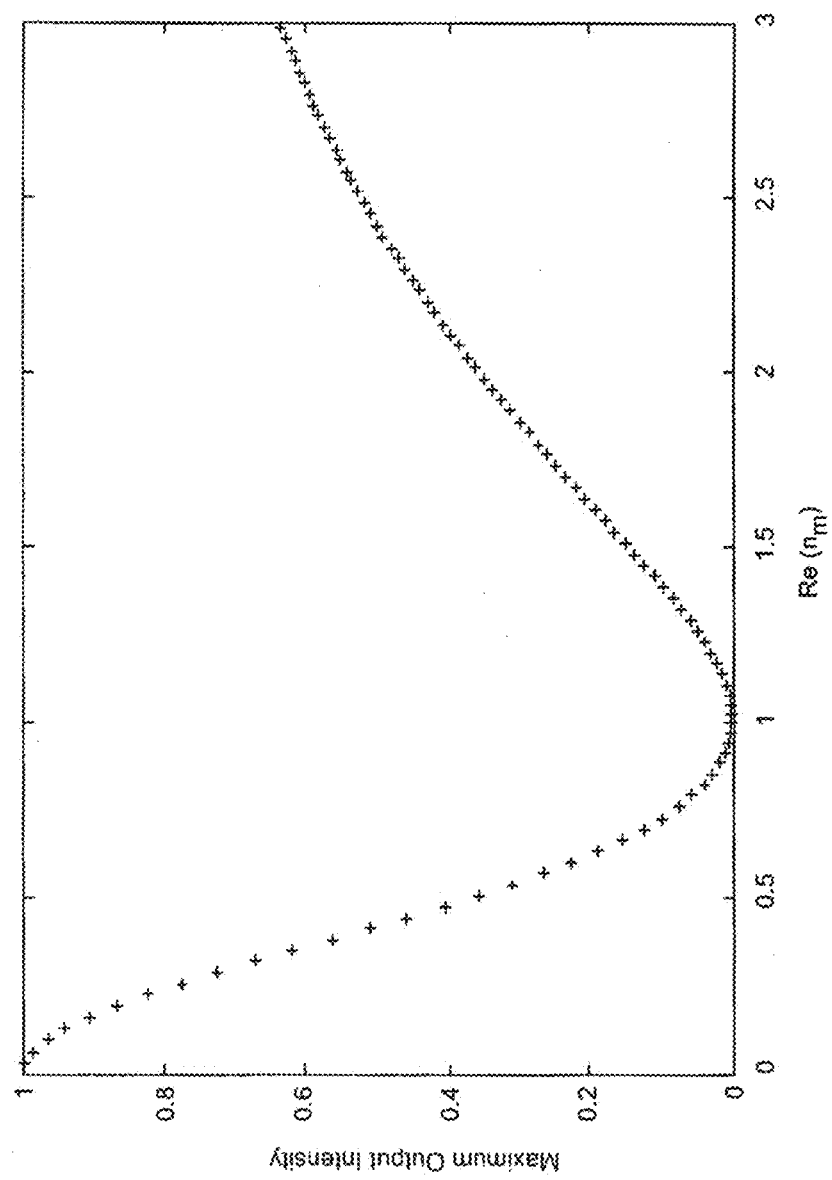
FIG. 5 illustrates the intensity contrast for the output intensity of the 100 microns thick Silicon wafer upon modulation of the relative phase of the beams of light applied to its two faces in accordance with an aspect of the present invention.

FIG. 5 illustrates the maximum contrast for the output intensity upon modulating the relative phase of the input beams as a function of the real part of the refractive index of the cavity material ($n_r$) for a uniform two-port structure and an external refractive index of n=1. When $n_r$ is large, the contrast varies as $1-4/n_r^2$. For uniform semiconducting materials in the weakly-absorbing regime, $n_r$ typically ranges between 2 and 5.

It should however be noted that the coherent perfect absorption concept is not restricted to uniform absorbing bodies. In fact, by adding absorption to a structure with a spatially varying real part of the index, perfect absorption resonances will occur in one-to-one correspondence with the scattering resonances of the body in the absence of absorption. This can be proven, by replacing amplification with absorption in standard laser calculations.

Figure 6:
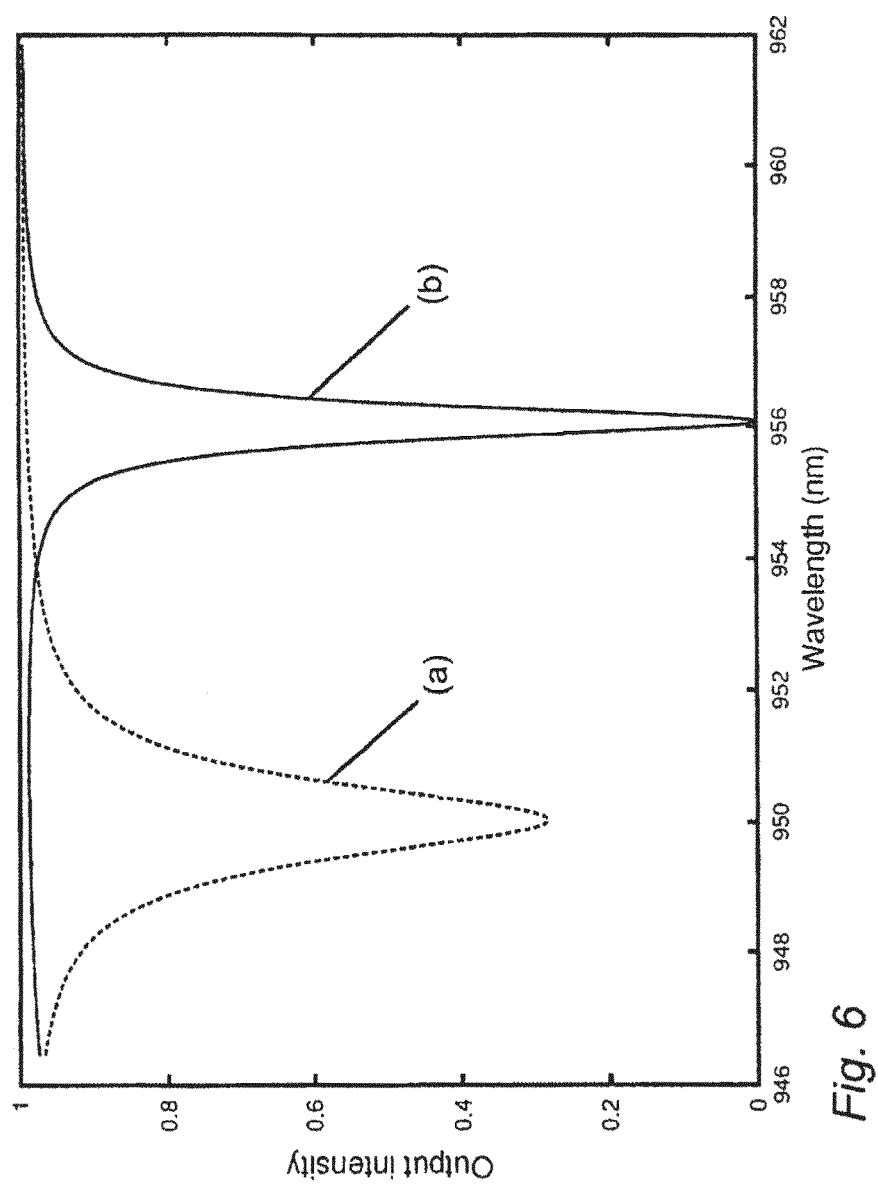
FIG. 6 illustrates the variation of the absorption as a function of wavelength in a structure composed of 20 bilayers of (a) Silicon and (b) Silica, in accordance with an aspect of the present invention.

For a non-uniform index material, the effective refractive index can be much larger than in uniform index materials. FIG. 6 illustrates the example of a coherent perfect absorber having a real index varying in layers—similar to a distributed Bragg mirror or a photonic crystal structure. The structure comprises 20 bilayers of silicon (188.5 nm) and silica (266 nm), in which case the absorption at 956 nm can be modulated from almost zero (2%—with 49% reflected and 49% transmitted) to nearly 100% (99.9%).

The processes described above find utility in a number of applications both realised and anticipated. Absorption or dissipation within the material may be manifested in heat, in which case the coherent perfect absorption technique may be used to modulate the flow of heat into a remote sink by varying the phase relationship between incident beams of light.

Figure 7:
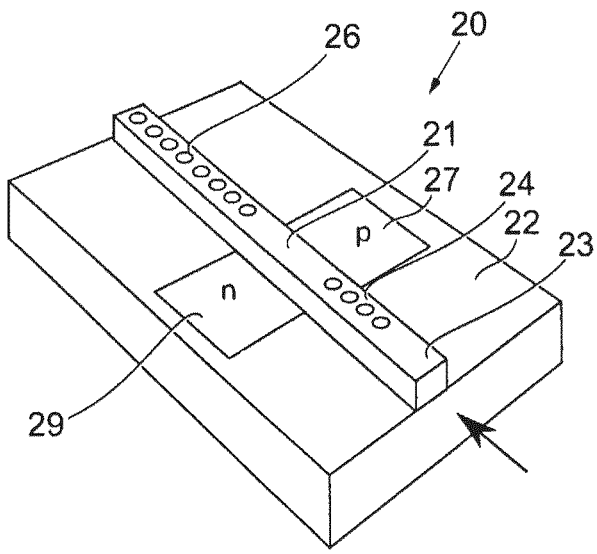
FIG. 7 illustrates in schematic form a transducer according to an aspect of the present invention.
Figure 7:
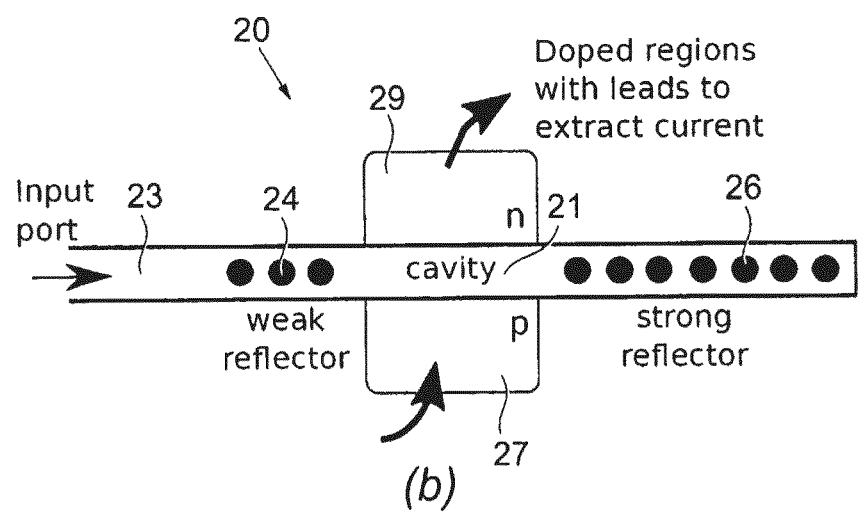

The technique can also provide substantial improvements in narrow-band collection of light energy. FIG. 7 illustrates in schematic form a one-port transducer 20 (as compared to the two-port embodiments described above) comprising a silicon substrate 22 and a waveguide 23 into which light is coupled, the waveguide having a cavity 21 defined by a weak reflector 24 and a strong (perfect) reflector 26 (both distributed Bragg reflectors). The specific irradiation pattern resulting in coherent perfect absorption is caused by interference between the incoming light with light reflected from the strong reflector.

The cavity 21 comprises the absorbing region in which coherent perfect absorption is to take place. Adjacent to the cavity, within the substrate, are doped regions 27,29 with contacts/leads to extract current generated by the dissipation of energy within the cavity 21 which generates electron-hole pairs.

Note that contrary to the laser analogy, indirect bandgap semiconductor materials that are typically difficult to make into lasers make good coherent perfect absorbers because the dissipated energy tends to be retained as heat or as electron-hole pairs which can be extracted. Silicon, utilised in a transducer as described above for example, may thereby be made to exhibit an enhanced photovoltaic response.

It should however be noted that the above systems are described in terms of narrowband illumination; broadband illumination will reduce the efficacy of a coherent perfect absorber because of the wavelength dependency of the absorption (resulting in the oscillation illustrated in FIGS. 2 and 3).

Figure 8:
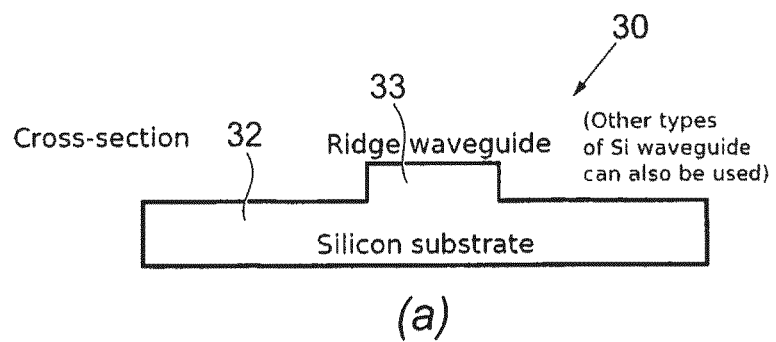
FIG. 8 illustrates in schematic form an interferometer according to an aspect of the present invention.
Figure 8:
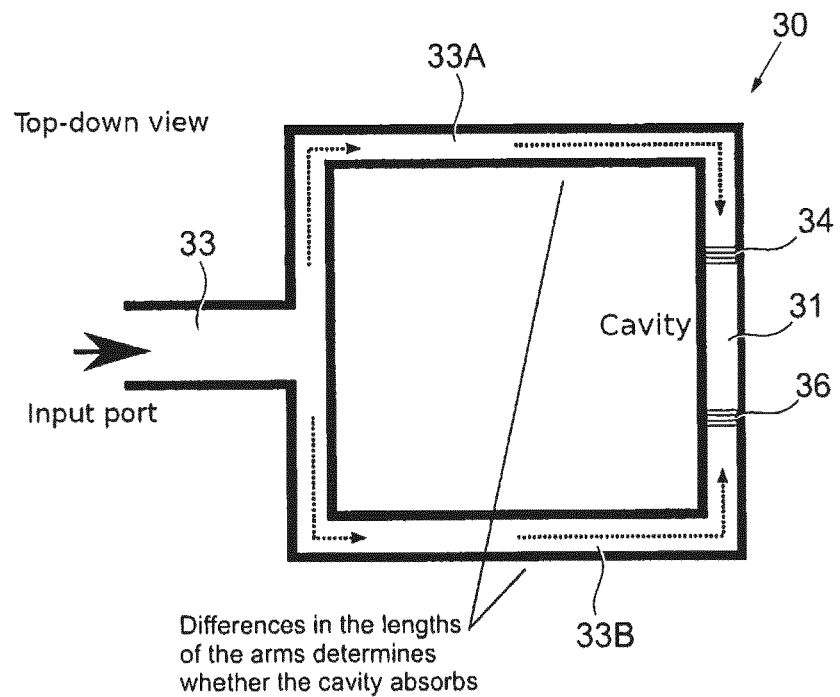

Another application of the present invention lies in interferometry. FIG. 8 illustrates in schematic form an absorptive interferometer 30 comprising a silicon substrate 32 and a waveguide 33. The interferometer has an input port into which light is coupled and the light is subsequently split between two waveguide arms 33A,33B which lead to a cavity 31 defined by two integrated mirrors 34,36 (e.g. distributed Bragg reflectors) and which forms the coherent perfect absorber. If the two incoming beams of light are appropriately phased (which depends on the optical length of the arms 33A,33B), coherent perfect absorption will take place and the light will be completely absorbed. Alternatively, if the two incoming beams of light are not appropriately phased, the light will be transmitted or reflected.

Light absorbed in the cavity can be converted into an electrical current, similarly to the transducer of FIG. 7, via doped regions in the substrate 32 adjacent to the cavity 31; the electrical output providing a measure of the phase relationship between the two incoming beams of light. Alternatively, the phase relationship may be measured via the modulation of heat flow in the cavity.

As an extension of the interferometric effect, the coherent perfect absorber may find utility in communications where it can be employed as an optical filter or switch. In the absence of a counter-propagating light beam, a signal light beam will traverse a coherent perfect absorber (which will be effectively transparent) and reach a receiver. However, if the receiving station (or indeed another downstream station) wishes to remotely stop the signal, a counter-propagating light beam can be transmitted which will then effect coherent perfect absorption to take place and prevent any light from being transmitted (while the counter-propagating beam is being transmitted). A light signal can thereby be used to switch on and off another light signal. Applications are also therefore foreseen in optical computing applications.

Of course, while the present invention has been described in terms of a two-beam system (as well as a one-beam system—the one-port transducer of FIG. 7), the present invention may obviously be realised with any number of input beams. For example, the applicant envisages a three-port device which acts as an "optical transistor"; in which a control beam fed to a first port may be used to turn a channel (between a second and third port) on and off. In the absence of the control beam, transmission between said second and third ports is permitted but a suitable optical signal or beam may be sent to the first port which interferes with the transmission in such a way that the coherent perfect absorption solution is realised and the light is completely absorbed. Such a transistor would be able to be switched rapidly, and would also find application in optical computing.

Conversely, the existence of absorption anti-resonances finds application in any situation where it is desirable to reduce absorption (i.e. increase transmission) normally experienced by incoherent illumination; for example, to allow imaging through partially opaque media.

The foregoing assumes that the incident light is polarised and coherent. If the light is unpolarised the coherent perfect absorption condition can typically only be realised for one of the polarisation channels at a particular frequency or phase relationship of the incident beams.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The basic premise of the coherent perfect absorber is to switch on and off (or vary therebetween) a resonance condition so as to switch on and off (or vary therebetween) the flow of energy (e.g. heat or electrical energy) into a material, or to switch on and off (or vary therebetween) the reflection and transmission of light through a coherent perfect absorber cavity between different stations. This can be achieved by varying the relative phase of incoming light beams, varying the frequency of the incoming light beams, selectively switching one of the incoming light beams on and off, or varying the refractive index of the absorbing medium onto and away from values that correspond to coherent perfect absorption. However, further modifications and improvements may be added without departing from the scope of the invention as defined by the appended claims.

The invention claimed is:

1. A method of controlling the absorption of light, the method comprising the steps of:
   providing a cavity comprising a medium having a complex index of refraction $n_m$, the cavity adapted to confine light within the medium; irradiating the cavity in a first direction with a first beam of light having a wavelength $\lambda$;
   irradiating the cavity in a second direction with a second beam of light having a same wavelength $\lambda$;
   configuring the first beam of light and the second beam of light such that a pattern of irradiation in the cavity created by an at least partially destructive interference between at least the first and second beams of light corresponds to the inverse of the emission pattern of a laser of wavelength $\lambda$ having a complex index of refraction $n_m^*$ that is the complex conjugate of the index of refraction of the medium $n_m$; and
   controlling one or more parameters of the cavity or one or both of the first and second light sources so as to control the amount of absorption of light by the medium within the cavity.

2. A method as described in claim 1, wherein the step of controlling one or more parameters of one or both of the first and second light sources comprises controlling the relative phase between the first light source and second light source.

3. A method as described in claim 1, wherein the step of controlling one or more parameters of one or both of the first and second light sources comprises controlling the frequency of one or both of the first light source and second light source.

4. A method as described in claim 1, wherein the step of controlling one or more parameters of the cavity comprises controlling the refractive index of the medium.

5. A method as described in claim 4, further comprising tuning the refractive index of the medium onto and away from values of the index of refraction that result in coherent perfect absorption.

6. A method as described in claim 1, wherein the refractive index of the medium is controlled by electrically or optically pumping the medium.

7. A method as described in claim 1, wherein the cavity is defined by interfaces between the medium and another medium of differing refractive index.

8. A method as described in claim 1, wherein the cavity comprises one or more reflectors which define such cavity.

9. A method as described in claim 1, wherein the step of irradiating the cavity in a second direction with a second beam of light comprises reflecting the first beam of light to provide said second beam of light, the second direction being parallel and opposite to the first direction.

10. A method as described in claim 1, wherein the method comprises irradiating the medium with one or more additional beams of light, each of said additional beams of light configured to interfere with the first, second and any other additional beams of light to create the pattern of irradiation.

11. A method as described in claim 1, further comprising the step of extracting energy corresponding to the absorbed light from the medium.

12. A method as described in claim 11, wherein the phase of the second beam of light is modulated so as to modulate the energy extracted from the medium.

13. A method as described in claim 11, wherein the method comprises the step of monitoring the energy extracted from the medium so as to determine the relative phase between the first and second beams of light.

14. A method as described in claim 1, wherein the step of controlling the first and second beams of light includes controllably switching on or off the second beam of light such that the medium selectively absorbs or transmits the first beam of light.

15. An absorber system for controlled absorption of light, the system comprising:
    a cavity comprising a medium having an index of refraction $n_m$;
    a first light source and a second light source, the first and second light sources irradiating the cavity in different directions;
    wherein the first and second light sources are configured such that a pattern of irradiation in the cavity created by an at least partially destructive interference between light from at least the first and second light sources corresponds to the inverse of the emission pattern of a laser medium having a complex index of refraction $n_m^*$ that is the complex conjugate of the index of refraction of the medium $n_m$; and
    whereby varying one or more parameters of the cavity or one or both of the first and second light sources correspondingly varies the amount of absorption of light by the medium within the cavity.

16. A system as described in claim 15, wherein varying the relative phase between the first light source and second light source correspondingly varies the amount of absorption of light by the medium within the cavity.

17. A system as described in claim 15, wherein varying the frequency of one or both of the first light source and second light source correspondingly varies the amount of absorption of light by the medium within the cavity.

18. A system as described in claim 15, wherein the cavity is defined by interfaces between the medium and another medium of differing refractive index.

19. A system as described in claim 15, wherein the cavity comprises one or more reflectors which define said cavity.

20. A system as described in claim 15, wherein the absorber system comprises one or more additional light sources, the or each additional light source configured such that light therefrom interferes with light from the first, second and any other additional light source to create the pattern of irradiation.

* * * * *